July 3, 1962  R. W. TACCONE  3,041,685
DIAPHRAGM MOLDING MACHINE
Filed July 14, 1961  7 Sheets-Sheet 1
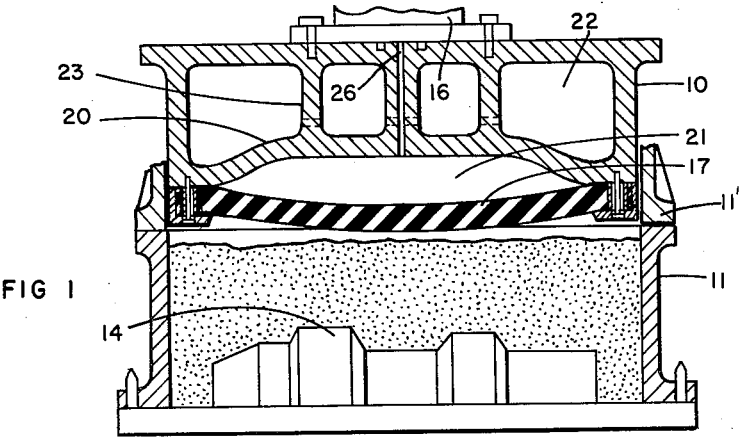
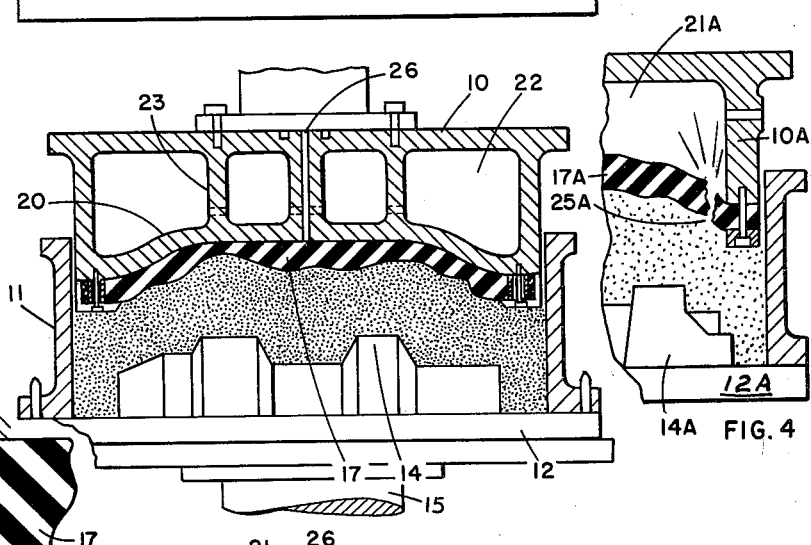
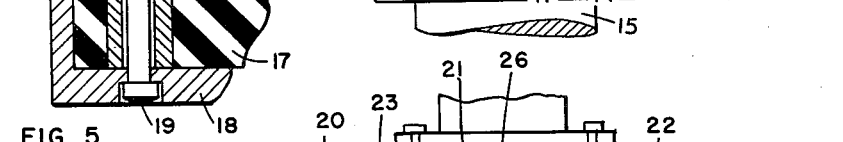
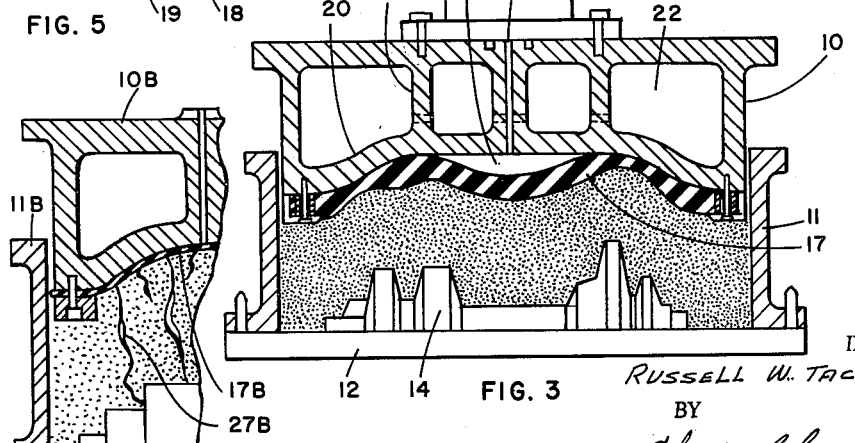
INVENTOR.
RUSSELL W. TACCONE
BY
Charles L. Lauchlan
atty July 3, 1962 R. W. TACCONE 3,041,685
DIAPHRAGM MOLDING MACHINE
Filed July 14, 1961 7 Sheets-Sheet 2

RUSSELL W. TACCONE INVENTOR.

BY
Charles L. Lovercheck
atty

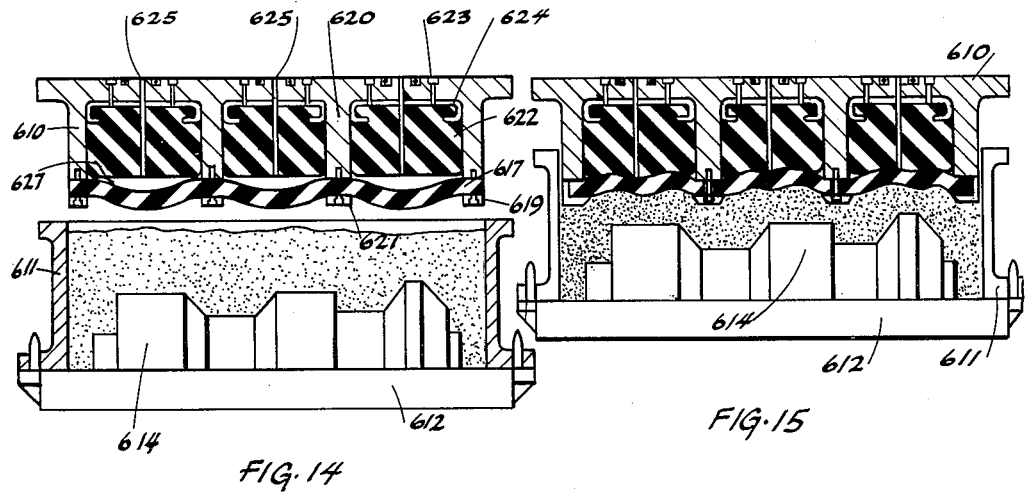
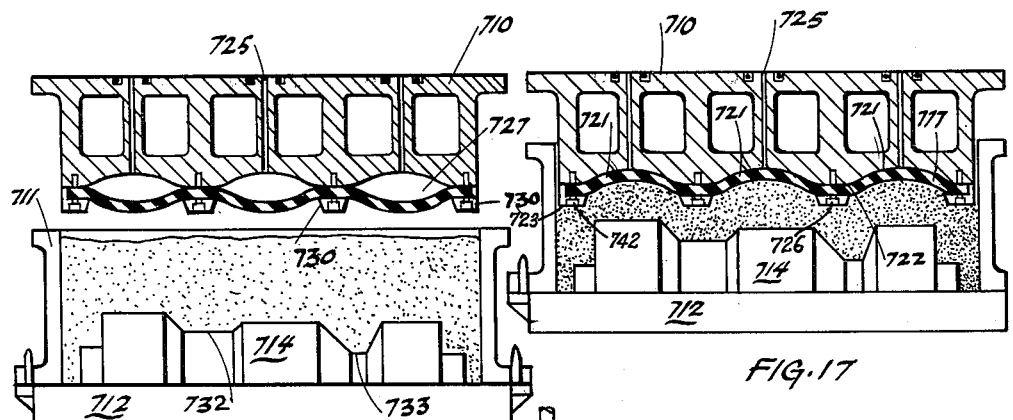
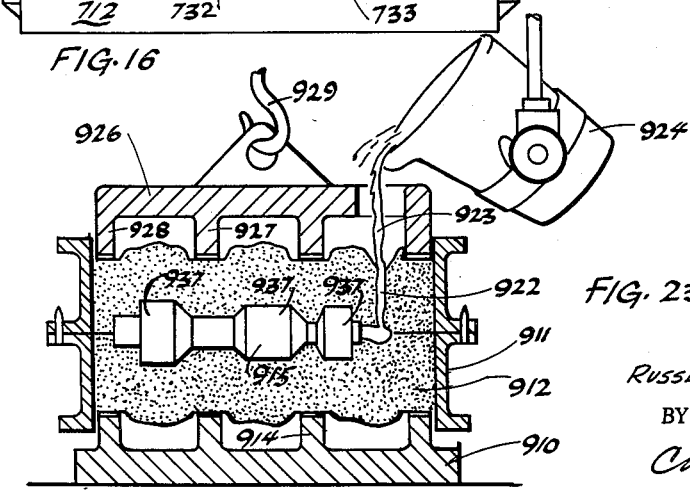

July 3, 1962     R. W. TACCONE     3,041,685
DIAPHRAGM MOLDING MACHINE

Filed July 14, 1961     7 Sheets-Sheet 4

Russell W. Taccone INVENTOR.

BY Charles L. Lovercheck
attorney

RUSSELL W. TACCONE INVENTOR.

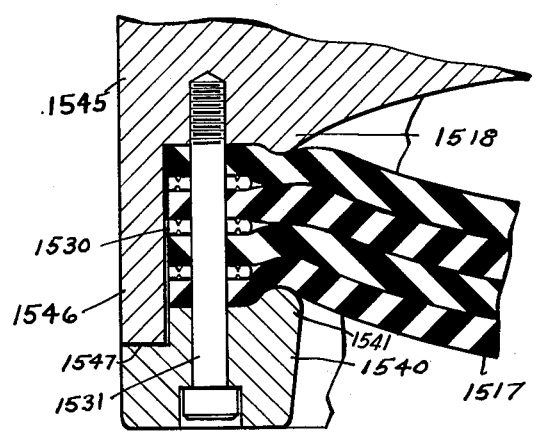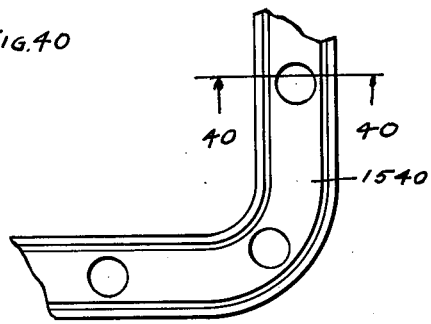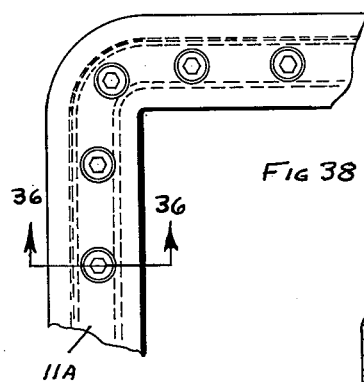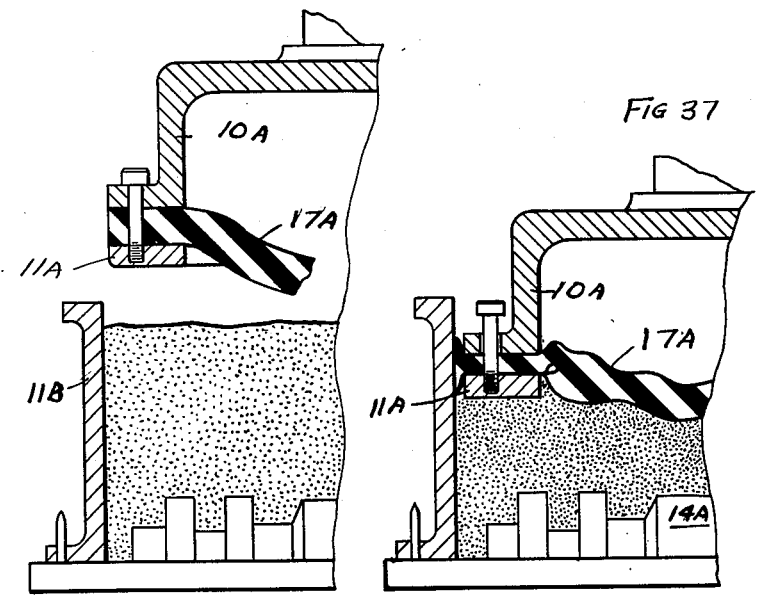

United States Patent Office 3,041,685
Patented July 3, 1962

3,041,685
DIAPHRAGM MOLDING MACHINE
Russell W. Taccone, Erie, Pa., assignor to Taccone
Corporation, a corporation of Pennsylvania
Filed July 14, 1961, Ser. No. 124,082
9 Claims. (Cl. 22—42)

This invention relates to molding machines and, more particularly, to molding machines of the diaphragm type.

It has been discovered that in order to make molds of optimum densities from green sand at high production rates, it is desirable to compress the sand to a given density with a relatively high initial force and exert a final force on the sand at a considerably greater pressure.

In order to carry out this process, it has been discovered that a relatively thick diaphragm or combination of layers of diaphragms made of resilient material with a gas pressure behind the diaphragms and a positive plate back-up member supported a spaced distance from the diaphragms were necessary so that, initially, the diaphragms are backed up by the gas pressure while an initial force is exerted on the sand and, thereafter, the diaphragms come in contact with the back-up plate and a final greater pressure is exerted on the sand. In addition to the foregoing, it has been found desirable in some cases to have a relatively thick diaphragm or combination of diaphragms which will themselves be deformed under pressure so that the diaphragms themselves adjust to the contour of the final mold surface and thereby compensate for mold hardness throughout the mold.

In a further embodiment of the invention, the compressible diaphragms can be backed up by a resilient back-up plate such as that made of hard rubber or other suitable material which will further enhance the effect of a positive, yet somewhat resilient, back-up plate.

Further, the invention contemplates a suitable contour formed at the edge of the back-up plate so that the diaphragm will be only stretched a minor amount at this point.

It is, accordingly, an object of the present invention to provide an improved molding machine.

Another object of the invention is to provide a molding machine wherein the diaphragm has sufficient thickness that substantially no stretching occurs therein; yet a substantial amount of compressive deformation occurs in the diaphragm.

Still another object of the invention is to provide a diaphragm type molding machine having a positive back-up plate which the diaphragm engages when it compresses air or gas behind the diaphragm.

A further object of the invention is to provide a resilient back-up plate for a diaphragm in a molding machine head.

Yet a further object of the invention is to provide an adjustable back-up plate in a diaphragm molding machine.

Still a further object of this invention is to provide a molding machine which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a cross sectional view of a molding machine having a head and flask according to the invention showing the diaphragm in relaxed position;

FIG. 2 is a view similar to FIG. 1 of the machine after a force has been exerted on the head and diaphragm;

FIG. 3 is a view similar to FIG. 2 showing a machine where a less force has been exerted and some air or gas is trapped behind the diaphragm;

FIG. 4 is a cross sectional view showing a different type of head wherein the usual failure of a diaphragm is shown;

FIG. 5 is an enlarged view of a part of the diaphragm shown in FIG. 3;

FIG. 6 is a cross sectional view of another type of head showing a thin diaphragm and the cracking which results in the sand with this type of diaphragm;

FIG. 14 is a view taken on line 14—14 of FIG. 21;

FIG. 15 is a cross sectional view of the embodiment of the invention shown in FIG. 14.

FIGS. 16 and 17 are views of yet another embodiment of the invention;

Figure 19:
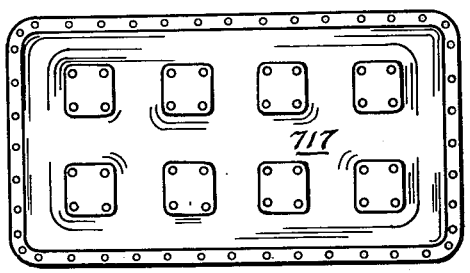
Figure 20:
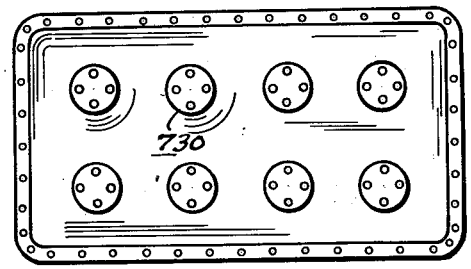
Figure 21:
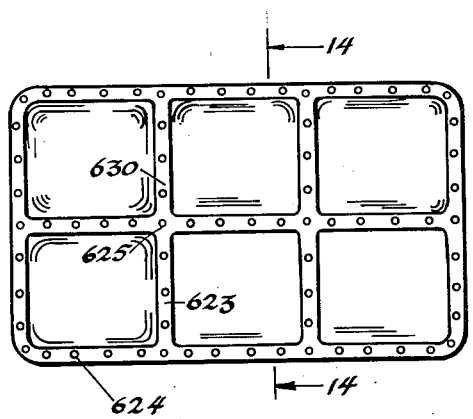
Figure 22:
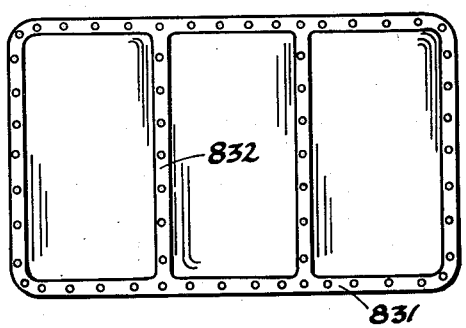

FIGS. 19 and 20 show alternate forms of clamping means for the embodiments shown in FIGS. 14 and 15 and 16 and 17;

FIG. 21 is a bottom view of the head shown in FIGS. 14 and 15 and 16 and 17;

FIG. 22 is another embodiment of a clamping frame which could be used in the embodiments shown in FIGS. 14 and 15, 16 and 17, and 18;

FIG. 23 shows an improved hold down arrangement for a flask;

FIGS. 24 and 25, 26 and 27, 28 and 29, 30 and 31, 32 and 33, and 34 and 35 show six other embodiments of the invention, respectively;

FIGS. 36 and 37 are cross sectional views taken on line 36—36 of FIG. 38;

FIG. 38 is a bottom view of the head of the machine shown in FIGS. 4, 36, and 37;

FIG. 39 is a broken partial view of the embodiment shown in FIG. 40; and

FIG. 40 is a cross sectional view taken on line 40—40 of FIG. 39.

Now with more particular reference to the drawings, the machine shown in FIGS. 1, 2, and 3 has a head 10 adapted to be telescopically received in the top of a flask 11. The flask could be provided with a suitable upset frame in order to increase its effective depth such as indicated at 11'. A pattern plate 12 supports pattern characters 14 and is carried by a suitable support 15 which constitutes a part of the molding machine. The head 10 may be either fixed to a hydraulic ram 16 on the machine or it could be fixed to the support 15 with the ram 16 exerting a force on the flask.

A diaphragm 17 is shown as a relatively thick member which, in practice, has been discovered should be of a minimum thickness of at least one-fourth inch, which has to be decided by size and shape of the molds, in order to achieve good molds. The diaphargm is made of resilient material such as rubber which will deform readily under pressure. The diaphragm 17 is clamped around its peripheral edges to the head 10 by means of a suitable clamping frame 18 which has a horizontal flange which extends inwardly under the diaphragm. The frame 18 has a vertical flange which engages the bottom part of the head with spacers 24 concentrically receiving bolts 19 which prevent excessive compressive force being exerted on the perimeter of the diaphragm when a force is applied to the machine head.

The head 10 has a back-up plate 20 therein which positively engages the diaphragm 17 as shown in FIGS. 2 and 3 when the machine is at the final part of the molding stroke. The diaphragm may or may not trap a small amount of air between it and the back-up plate 20 as indicated at 25 in FIG. 3. The backup plate defines a cavity 22 between it and the head into which the air is compressed from a cavity 21 between the diaphragm and the back-up plate when an excessive force is exerted by the head. Ribs 23 reinforce the plate 20 and support it on the head rigidly thereon.

A suitable inlet 26 is provided for admitting air into the cavity and this can be provided from a source of compressed air, from an accumulator, or a fixed amount of air could be trapped in it and held therein.

It will be noted from FIGS. 2 and 3 that the diaphragm changes shape substantially in itself because of compressive deformation thereof when a force is exerted thereon by the head 10. This allows the diaphragm itself to compensate somewhat for mold density throughout various parts of the mold and prevents the mold from cracking because of local hardness as it would do with a thin diaphragm such as indicated at 17B used in a flange 11B with a head 10B as shown in FIG. 6.

If the back-up plate is not provided in the head and the head is relatively deep with air therebehind, the diaphragm will tend to break at the edge thereof as is indicated in FIG. 4 wherein a diaphragm 17A is indicated fractured at 25A or with a mold made on a pattern plate 12A having patterns 14A thereon. This is because sufficient air pressure cannot ordinarily be applied in the head at 21A without exerting too great a concentration of force on the sand to force a good mold without cracking. FIG. 36 shows head 10A in position ready to compress the sand in the mold. FIG. 37 shows the head 10A compressing the sand and the reaction of the sand on the peen frame which distorts the diaphragm 17A as indicated and causes it to extrude outwardly between the edge of the head and flask 11A.

Figure 7:
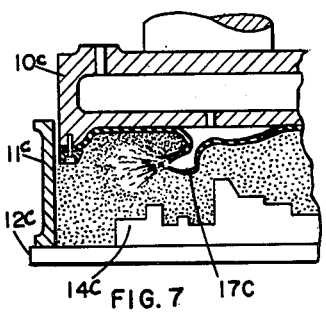
FIG. 7 is a cross sectional view of a machine using a thin diaphragm wherein a characteristic type of barrier or thin diaphragm is shown.

In FIG. 7, a condition is shown wherein a thin diaphragm tends to balloon out as indicated at 17C when such a thin diaphragm is used and the thin diaphragm engages the top of the sand wherein a soft spot happens to be.

Figure 8:
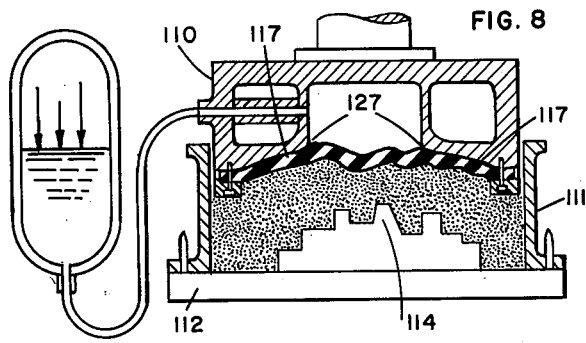
FIG. 8 is a cross sectional view of another embodiment of the invention.
Figure 9:
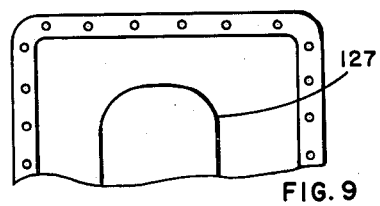
FIG. 9 is a bottom view of the head shown in the embodiment disclosed in FIG. 8.

FIGS. 8 and 9 show another embodiment of the invention wherein a flask 111 is supported on a pattern plate 112 and a head 110 supported thereabove. A diaphragm 117 is a relatively thick, heavy resilient member which is subject to compressive deformation. The head 110 has an opening 127 therein so that the central part of the diaphragm over the high place of a pattern 114 can be deformed up into the opening 127. Thus, a lesser compressive force is exerted over the high spot on the pattern 114. This will prevent cracking of the mold.

Figure 10:
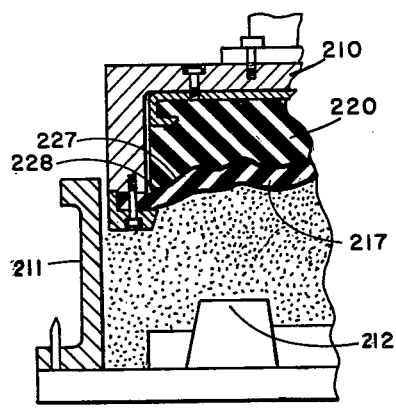
FIG. 10 is a cross sectional view of another embodiment of the invention.

In FIG. 10, a head 210 supported over a flask 211 having a pattern plate 212 therein has a heavy diaphragm 217 clamped thereto with a resilient back-up plate 220 supported behind the head and having a contoured portion 227 with a downwardly extending flange 228 around the edge. The flange 228 terminates adjacent the diaphragm 217 and prevents undue stressing thereof at this point and thereby prevents shearing it off. The resilient head has some deformation characteristics so that at the final heavy force exerted on the sand, the head will not crack below.

Figure 11:
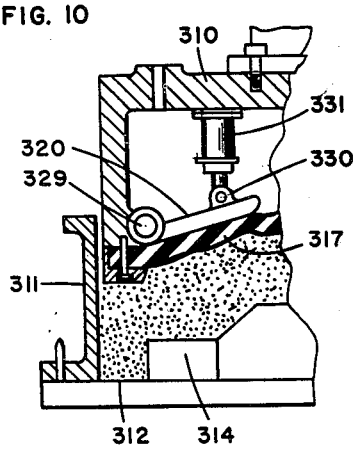
FIG. 11 is a cross sectional view of yet another embodiment of the invention.

In the embodiment of the invention shown in FIG. 11, a flask 311 is supported on a pattern plate 312 with a pattern 314 supported thereon. A diaphragm 317 is similar to the diaphragm 17 shown in the embodiment of FIGS. 1, 2, and 3. Backup plates 320 are swingably connected to the lower edge of the head at 329. These back-up plates are generally rectangular in cross section but can have other suitable shapes and the inner ends thereof are swingably connected at 330 to the piston rod of a cylinder 331. The cylinder 331 is fixed to the top of head 310 and air or gas under pressure will be provided inside the cylinder so that as the final forces are exerted on the head 310 in compressing the sand over the pattern 314, the material in the cylinder 331 will be compressed to give a slight yielding force to the diaphragm.

Figure 12:
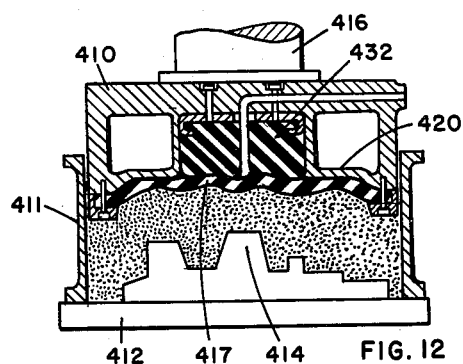
FIG. 12 is a view of still yet another embodiment of the invention.

In the embodiment of the invention shown in FIG. 12, a head 410 is supported above a flask 411 which is supported on a pattern plate 412 with a pattern 414 supported thereon. A diaphragm 417 is similar to that shown in FIGS. 1, 2, and 3 and a back-up plate 420 has an opening in the center thereof which receives a resilient block of material such as hard rubber or other suitable material indicated at 432. The head 410 is supported on a suitable ram 416 which moves it up and down.

Figure 13:
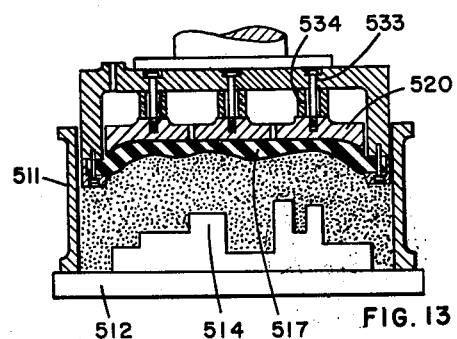
FIG. 13 is a view of still another embodiment of the invention.

In the embodiment of the invention shown in FIG. 13, a flask 511 is supported on a pattern plate 512 with a pattern 514 thereon. The head has a diaphragm 517 similar to the diaphragm 17 in the embodiment of the invention shown in FIGS. 1, 2, and 3. A back-up plate 520 is adjustably supported on the head by bolts 533 which extend through the top of the head and through spacer blocks 534. These bolts can be removed and the spacer blocks 534 changed to shorter or longer spacer blocks so that the spacing between the back-up plate and the diaphragm can be thus controlled.

In the embodiment of the invention shown in FIGS. 14 and 15, a flask 611 is shown with a head 610 supported above it. The head has a diaphragm 617 clamped to the peripheral edges at 619 and to intermediate webs 620 aat 621. The flask 611 has a pattern character 614 suported on a pattern plate 612. Resilient back-up block members 622 are supported in the rectangular spaces between the webs 620 by bolts 623 which engage supporting frame members 624 which have inwardly turned ends which are embedded in the back-up members 622. Passages 625 may be connected to suitable sources of air or gas under pressure so that the pressure of the air or gas in spaces 627 between the diaphragm and the back-up members 622 may be varied.

It will be seen that in the embodiment of the invention shown in FIGS. 14 and 15, the gas from passages 625 will be compressed in the spaces or chambers 627 and when the pressure exerted on the head 610 by the molding machine increases to a sufficient value, the diaphragm 617 will come into contact with the back-up members 622 as shown in FIG. 15 and a more positive force will be exerted on all parts of the diaphragm.

In the embodiment of the invention shown in FIGS. 16 and 17, a head 710 is shown supported over a flask 711 which is carried by a pattern plate 712 having pattern characters 714 supported thereon. The head 710 has a plurality of spaced concave surfaces 721 which are bound by rims 722 and a diaphragm 717 is clamped to these rims by a frame 723. The frame 723 is held in place by peripheral bolts 742 and intermediate bolts 726. Air under pressure may be inserted between the backup plate and the diaphragm through bores 725.

In this embodiment, when the pressure on the head is increased to a sufficient value, gas from passages 725 will be compressed in spaces 727 between the diaphragm 717 and the concave surface 721 as shown in FIG. 17 and a more positive force will be exerted on the sand. It will be seen that by providing the frame members 730 between the concave surfaces 721, a positive force is exerted above depressed portions 732 and 733 of the pattern so that the sand will be compressed more thoroughly down into these depressions.

Figure 18:
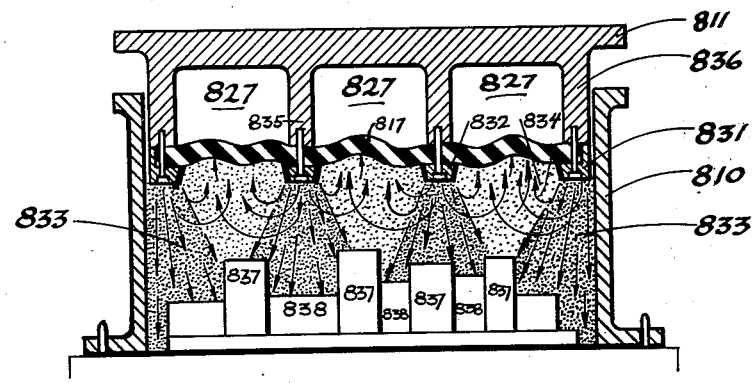
FIG. 18 is a cross sectional view of another embodiment of the molding machine.

In the embodiment of the invention shown in FIG. 18, a flask 810 has a head 811 supported above it and adapted to be telescopically received therein. Cavities 827 are filled with compressed air or other suitable gas and are closed by a heavy diaphragm 817. The diaphragm 817 is clamped around its outside edges by a frame 831 and at intermediate positions by intermediate parts 832 of the diaphragm 817. The frame 831 exerts a force downwardly on the sand in approximately the direction of the arrows indicated at 833 and the sand exposed to the forces 833 exerts a force upwardly approximately as shown indicated at 834. This force is counterbalanced by the portions of the diaphragm 817 between webs 835 and outside portions 836 of the head. Thus, the sand between raised portions 837 of the pattern is exposed to a uniformly heavy pressure to that which intermediate parts 838 are exposed and, during the final stages of compression, the sand between the portions exposed to the force indicated at 833 will be finally compressed to a hardness equal to the other other parts.

In the embodiment of the invention shown in FIG. 23, a support member 910 supports a flask 911 by engaging the lower surface of sand 912 in the flask by upwardly extending web members 914 which engage the sand at spaced positions. The mold is shown having a cavity 915 which is formed by a suitable pattern and have a sprue hole 922 to receive the molten metal 923 from a ladle 924.

In order to counterbalance the high ferrostatic pressure generated by the molten metal in the mold, a hold down member 926 is supported on top of the sand. This hold down member also has web members 927 which rest on the sand on the high density areas which have been compressed to a high density by the frame members 730 in the embodiment of FIGS. 16 and 17, for example. Thus, only high density areas are engaged and the sand is much less likely to rupture since the members 927 rest on high density sand.

The hold down member 926 has peripheral hold down webs 928 which engage the sand just inside the flask 911. The hold down member 926 can be raised by a suitable crane indicated at 929 and it will be of sufficient weight to hold the cope in place on the drag during pouring. Since the web members 927 are supported between the high portions 937 on the pattern, the force exerted by them will project outwardly and downwardly to prevent the high ferrostatic pressure of the molten metal from breaking through the sand and, also, to prevent the cope from floating off of the drag.

Figure 24:
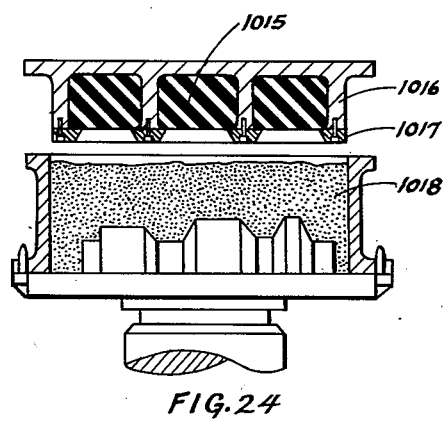
Figure 25:
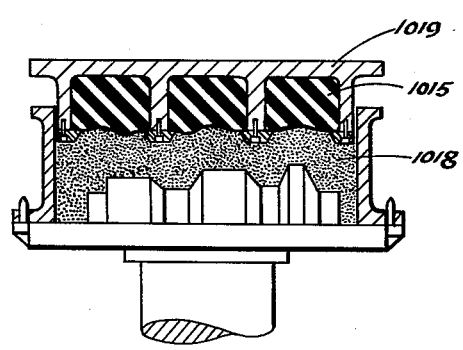

In the embodiment of the invention shown in FIGS. 24 and 25, resilient members 1015 in the spaced compartments in a head 1019 above a peen block 1017 rest directly on the sand 1018 so that when the head 1019 is forced down onto the sand 1018, the resilient members 1015 are deformed as shown in FIG. 25 to compensate for the variations in compressibility of the sand. The peen block 1017 is attached to a downwardly extending flange 1016. The structure shown in this embodiment will make excellent molds with certain characteristics of sand and patterns.

Figure 26:
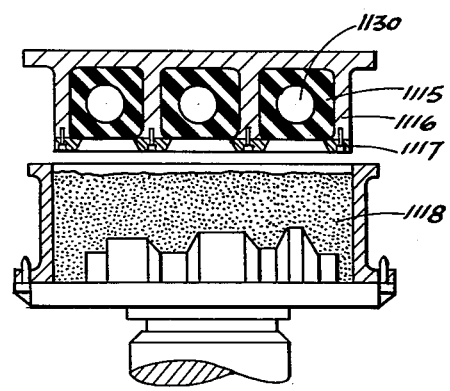
Figure 27:
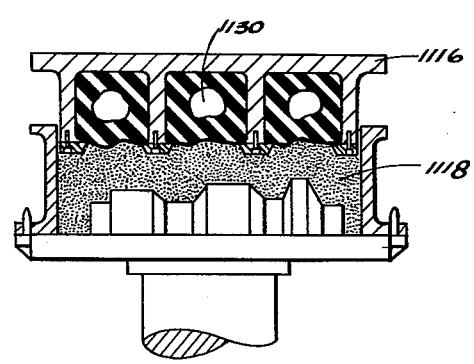

In the embodiment of the invention shown in FIGS. 26 and 27, resilent blocks 1115 are supported in the compartments between the partitions in a head 1116. The lower surfaces of the resilient blocks 1115 between peen blocks 1117 engage the sand and openings 1130 therein give the resilent blocks additional flexibility. When the head 1116 is forced down onto the sand 1118, the resilient blocks 1115 are deformed to take care of variations in compressibility of the sand 1118 as shown and, therefore, compensate for the variations in compressibility in order to result in a mold which is of uniform hardness throughout.

Figure 28:
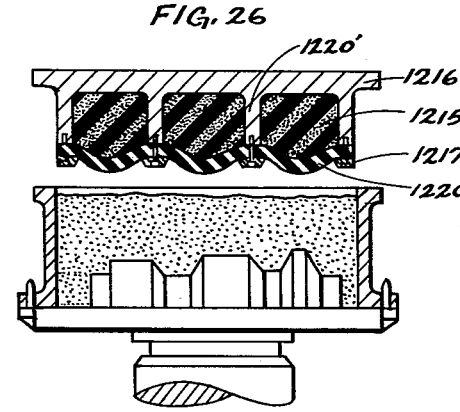
Figure 29:
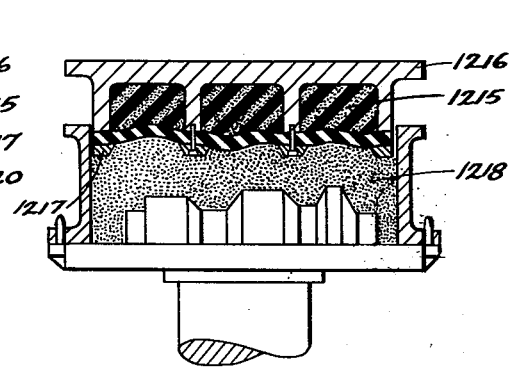

In the embodiment of the invention shown in FIGS. 28 and 29, a head 1216 has sponge rubber 1215 or similar material between the partitions in the head 1216. A diaphragm 1220 is clamped by bolts extending through a peen block frame 1217 and clamped to intermediate portions 1220'. The sponge rubber 1215 is under initial compressibility so that it causes the diaphragm 1220 to extend outwardly in a concave manner. Then when the head 1216 is forced down into engagement with the sand 1218, the sponge rubber 1215 is compressed in the head 1216 and the peen block frame 1217 exerts a positive force on the sand so that the force on the sand will compensate for the variations in density thereof throughout the mold and result in a mold of uniform density.

Figure 30:
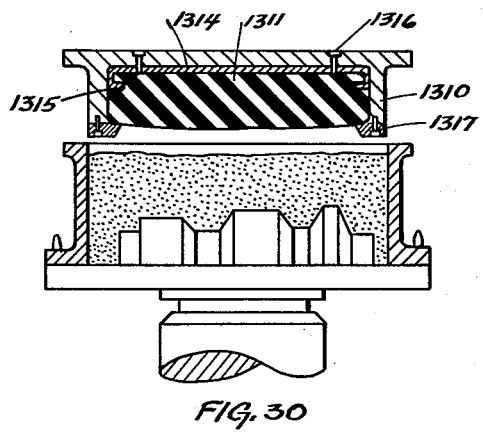
Figure 31:
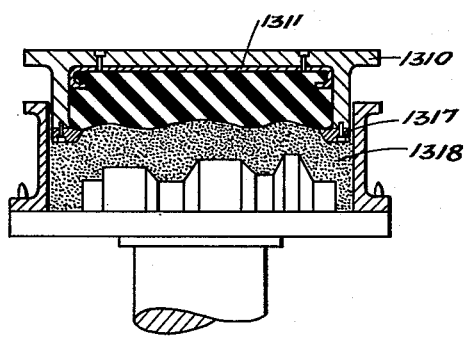

FIGS. 30 and 31 show a head 1310 having a cavity therein which receives a block of resilient material 1311 which may be in the form of soft rubber or similar material. This block has a frame 1314 with inwardly turned edges 1315 which extend into the resilient material 1311 and the frame is fastened to the head by means of bolts 1316. A peen block frame 1317 assists in holding the resilient material 1311 in the head.

When the head 1310 is forced down onto the sand 1318, the peen block frame 1317 will exert a positive force around the outside edge while the resilient material 1311 will exert a yielding force which will cause the resilient material to deform as shown in FIG. 31 to compensate for the variations in compressibility of the sand so that the resulting mold will be of uniform hardness. This type of head will result in excellent molds under certain conditions.

Figure 32:
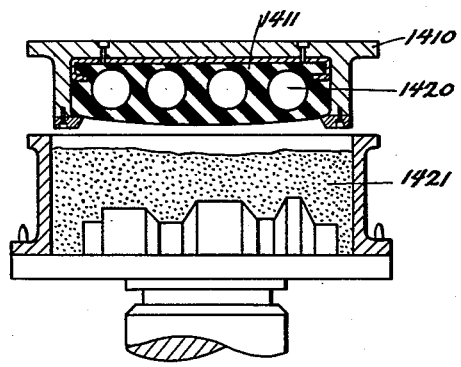
Figure 33:
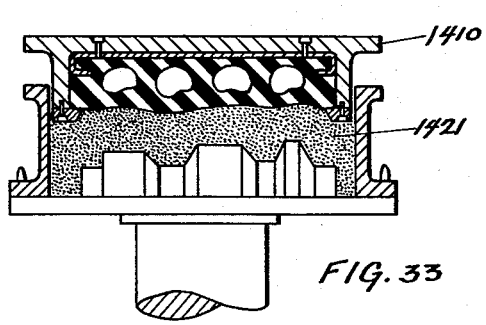

The embodiment of the invention shown in FIGS. 32 and 33 is similar to that shown in FIGS. 30 and 31 except that openings 1420 are formed in a resilient member 1411 in a head 1410. This gives the resilient member 1411 more flexibility and it has a tendency to more efficiently compensate for the contour of the sand 1421 under certan circumstances.

Figure 34:
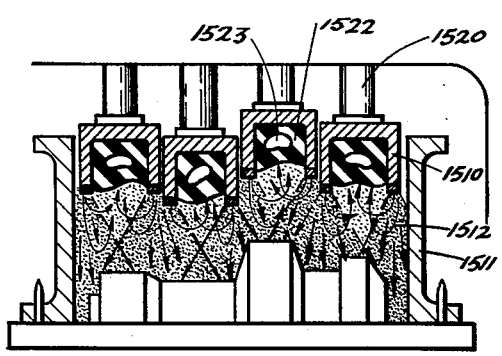
Figure 35:
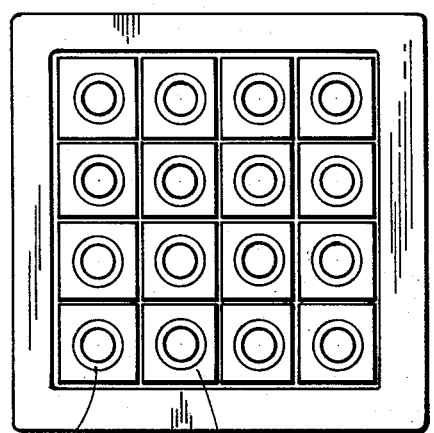

The embodiment of the invention shown in FIGS. 34 and 35 discloses a flask 1511 having sand 1512 therein. Head members 1510 are supported on piston rods 1520 which are individually supported and force the sand downwardly when they are extended as shown. Each of the head members 1510 has a cylindrical opening 1521 therein which has a resilient member 1522 therein. The resilient members 1522 may have a cavity 1523 therein for additional flexibility and resilient material 1525 around the cavity will exert a positive force on the sand while the flexible member 1522 will exert a yielding force. Therefore, the force exerted on the sand will be much as that shown in FIG. 34 when the head members 1510 are forced downwardly into engagement with the sand. Therefore, a mold of uniform density will result.

In the embodiment of the invention shown in FIGS. 39 and 40, a peen frame 1540 has a ridge 1541 which deforms a diaphragm 1517 and coacts with a ridge 1518 to hold the diaphragm layers in position. Washers 1530 are disposed between the layers of the diaphragm 1517 and receive bolts 1531. The bolts 1531 extend through the peen frame 1540 and clamp it to a head 1545. A downwardly extending flange 1546 on the head engages a shoulder 1547 on the peen frame 1540 and prevents it from crushing the edges of the diaphragm as is done in the embodiment shown in FIG. 37 whereby the diaphragm is extruded outwardly and binds on the inside of the flask.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A molding machine comprising a head, means to support a flask below said head, a backup plate on said head, said backup plate having a flat peripheral surface, depression thereon defining a smooth continuous concave surface merging with said flat surface, a diaphragm made of flexible material and being at least ½ inch in thickness and substantially flat in normal condition, said diaphragm overlying said flat surface and being attached thereto, said diaphragm being adapted to rest on said concave surface over substantially the entire area thereof during molding, the outer dimension of said backup plate corresponding substantially to the inner dimension of said flask, and means to force gas under pressure between said backup plate and said diaphragm.

2. The molding machine recited in claim 1 wherein a rigid open clamping frame is disposed over said diaphragm and supporting the outer edges of said diaphragm to said flat surface, and means holding said clamping frame at a fixed distance from said flat surface.

3. The machine recited in claim 2 wherein said means holding said frame a fixed distance from said flat surface comprises rigid sleeves extending through said diaphragm and having one end engaging said head and the other end engaging said frame and bolts extending through said sleeves and said frame and threadably engaging said backup plate.

4. The machine recited in claim 3 wherein said frame is L-shaped in cross-section and one leg of said L extends around the outer edge of said diaphragm and rests against said flat surface.

5. The machine recited in claim 1 wherein said backup plate has a plurality of depressions therein each bounded by a flat surface and said diaphragm overlies said depressions and is attached to said flat surfaces, a frame coextensive with said flat surfaces and having a plurality of openings therein coextensive with said depressions, and means attaching said frame to said flat surfaces with said diaphragm therebetween.

6. The machine recited in claim 3 wherein said depressions are defined by relatively rigid material relative to said diaphragm.

7. The machine recited in claim 1 wherein said backup plate is made of two parts, one having said flat surface thereon and the other having said smooth concave surface thereon, said part having said concave surface thereon being adjustable to move it to adjust the depth of said depression.

8. The machine recited in claim 1 wherein said backup plate comprises a molding machine head attached to the ram of a hydraulic press.

9. A method of compressing green sand in a flask around a pattern therein comprising filling said flask with sand, initially exerting a force on said sand just inside the peripheral edges of said flask with a rigid member, simultaneously exerting a force on the sand inwardly of said peripheral edges with a yielding member urged by a yielding force, whereby said rigid member and said yielding member move said sand generally straight down, and continuing said force on said sand with said rigid member and said yielding member whereby a substantial amount of said sand is moved toward the center of said flask and over and around said pattern, continuing said force on said sand with said rigid member and said yielding member over substantially the entire area thereof whereby some of said sand is moved toward the center of said flask and some of said sand inward from said peripheral edges is moved upward relative to the sand at said peripheral edges, continuing said force on said sand with said rigid member and simultaneously exerting a force directly on said yielding member with a relatively rigid member engaging said yielding member over substantially the entire area of said yielding member, whereby said sand is positively moved generally straight down throughout the entire flask to form a mold of substantially uniform hardness.

References Cited in the file of this patent

UNITED STATES PATENTS

| | | |
|---|---|---|
| 346,379 | Moore | July 27, 1886 |
| 408,386 | Moore | Aug. 6, 1889 |
| 2,805,455 | Whitesell | Sept. 10, 1957 |
| 2,962,775 | Rekart | Dec. 6, 1960 |

FOREIGN PATENTS

| | | |
|---|---|---|
| 883,799 | Germany | July 20, 1953 |
| 1,223,097 | France | Jan. 25, 1960 |